United States Patent
Veine et al.

(10) Patent No.: US 10,195,969 B2
(45) Date of Patent: Feb. 5, 2019

(54) VEHICLE SEAT WITH ENERGY ABSORBING IMPACT PAD

(71) Applicant: Lear Corporation, Southfield, MI (US)

(72) Inventors: Eric Veine, Wixom, MI (US); Ashford Galbreath, Troy, MI (US); Thomas Hicks, Livonia, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 15/392,634

(22) Filed: Dec. 28, 2016

(65) Prior Publication Data

US 2018/0178686 A1  Jun. 28, 2018

(51) Int. Cl.
*B60N 2/42* (2006.01)
*B60N 2/64* (2006.01)
*B60N 2/68* (2006.01)
*B60N 2/427* (2006.01)

(52) U.S. Cl.
CPC ....... *B60N 2/4221* (2013.01); *B60N 2/42709* (2013.01); *B60N 2/64* (2013.01); *B60N 2/68* (2013.01)

(58) Field of Classification Search
CPC .......... B60N 2/4221; B60N 2/64; B60N 2/68; B60N 2/42709
USPC .......................... 297/452.18, 216.13, 216.14
See application file for complete search history.

(56) References Cited

U.S. PATENT DOCUMENTS

| 2,867,266 | A  |   | 1/1959  | Vogler |
|---|---|---|---|---|
| 3,253,859 | A  |   | 5/1966  | Merriman et al. |
| 3,877,749 | A  | * | 4/1975  | Sakurai ............... B60N 2/4256  297/216.14 |
| 6,003,937 | A  |   | 12/1999 | Dutton et al. |
| 6,679,550 | B2 | * | 1/2004  | Goor .................... B60N 2/2806  297/216.11 X |
| 6,733,064 | B2 | * | 5/2004  | Fox ......................... B60R 21/04  280/751 X |
| 7,234,771 | B2 | * | 6/2007  | Nakhla ................ B60N 2/2845  297/219.12 |
| 7,506,926 | B2 | * | 3/2009  | Carine ................... B60N 2/885  297/216.11 |
| 8,690,237 | B2 | * | 4/2014  | Allen .................... B60N 2/2851  297/216.11 |
| 8,979,204 | B2 |   | 3/2015  | Awata et al. |
| 9,126,504 | B2 | * | 9/2015  | Line ....................... B60N 2/643 |
| 2011/0012406 | A1 | * | 1/2011  | Gibson ............... B60N 2/2851  297/250.1 |

* cited by examiner

*Primary Examiner* — Anthony D Barfield
(74) *Attorney, Agent, or Firm* — MacMillan, Sobanski & Todd, LLC

(57) ABSTRACT

A vehicle seat back includes a seat back frame. An impact pad is supported on the seat back frame. The impact pad includes a pad body that is located on a rear side of the seat back frame. The impact pad includes a frame contact surface that matches a contour of the seat back frame. The vehicle seat back also includes one of more spaces located between the pad body and the seat back frame.

7 Claims, 6 Drawing Sheets

VEHICLE SEAT WITH ENERGY ABSORBING IMPACT PAD

BACKGROUND OF THE INVENTION

This invention relates in general to vehicle seats. In particular, this invention relates to an improved structure for a vehicle seat including a seat back having an energy absorbing safety protection feature.

Vehicles, such as passenger cars, include seats for the driver and occupants. These seats typically include a seat back portion, which supports the back of the occupant. The seat back portion of the seat includes a relatively rigid, structural frame, with occupant support and cushioning features supported on the seat frame. The seat frame is typically made from a material such as steel or aluminum. The occupant support and cushioning features typically include springs, foam, and a trim or upholstery layer. These features help prevent the occupant from contacting the seat frame and make the seat more comfortable for the occupant.

The seat back also typically includes a cushion or padding on a rear side and an upper side of the seat frame. This cushioning is provided to help protect an occupant of a rear seat in the vehicle. In the event of a sudden stop, the rear seat occupant may be thrown forward against the seat back. The padding helps prevent the occupant from striking the seat frame. It would be desirable to have an improved structure to provide padding on the seat frame, while also being able to maintain a desired appearance of the seat back.

SUMMARY OF THE INVENTION

This invention relates to a vehicle seat back. The vehicle seat back includes a seat back frame. An impact pad is supported on the seat back frame. The impact pad includes a pad body that is located on a rear side of the seat back frame. The impact pad includes a frame contact surface that matches a contour of the seat back frame. The vehicle seat back also includes one of more spaces located between the pad body and the seat back frame.

This invention also relates to a vehicle seat back. The vehicle seat back includes a seat back frame. An impact pad is supported on the seat back frame. The impact pad includes a pad body that is located on a rear side of the seat back frame. The impact pad also includes an energy absorbing foam located between the pad body and the seat back frame. The energy absorbing foam is made of a softer material than the pad body.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 1:
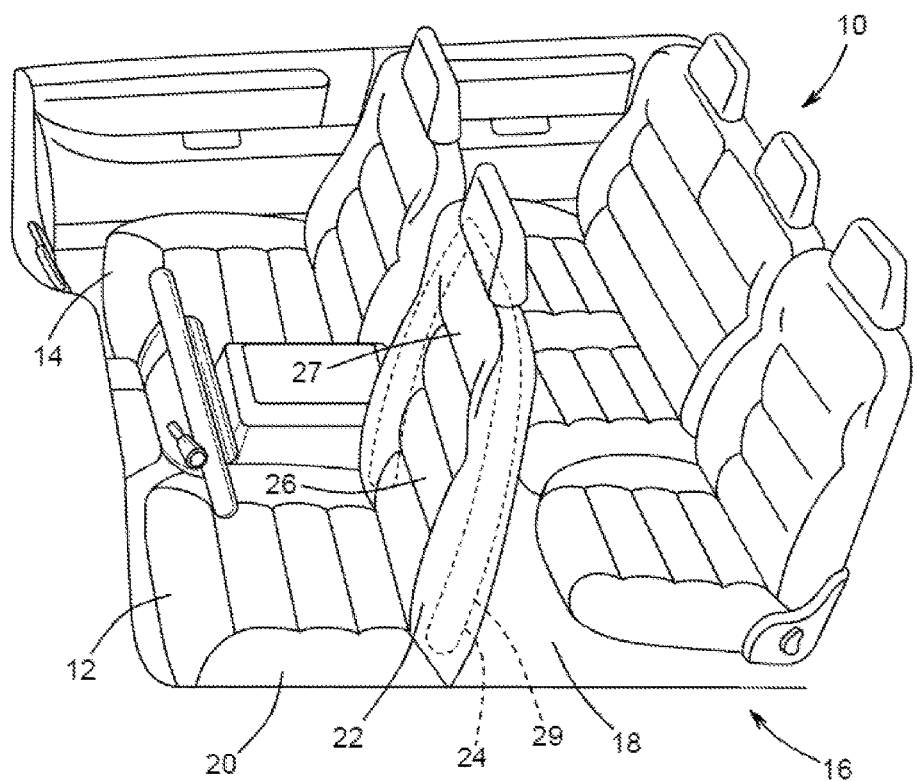
FIG. 1 is a perspective view of an interior passenger compartment of a vehicle including two front seats and a rear seating area.

Referring now to the drawings, there is illustrated in FIG. 1 a vehicle interior, indicated generally at 10. The vehicle interior 10 includes a driver seat 12, a front passenger seat 14, and rear seats indicated generally at 16. The respective seats are mounted to a vehicle floor 18. The driver seat 12 includes a seat portion 20 and a seat back 22. For the purposes described herein, only the driver seat 12 will be described in regards to its structure, but it should be understood that each seat in the vehicle may utilize this composition.

The seat back 22 includes a structural seat back frame 24. The seat back frame 24 provides structural support to the seat back 22. The illustrated seat back frame 24 is made of steel, but may be made of any desired material. The seat back frame 24 supports an occupant support 26. Assembly of the occupant support 26 is known in the art, and is not described in detail. Any desired occupant support 26 may be used. The seat back 22 includes a trim layer 27, which provides a protective outer skin for seat back 22.

Figure 2:
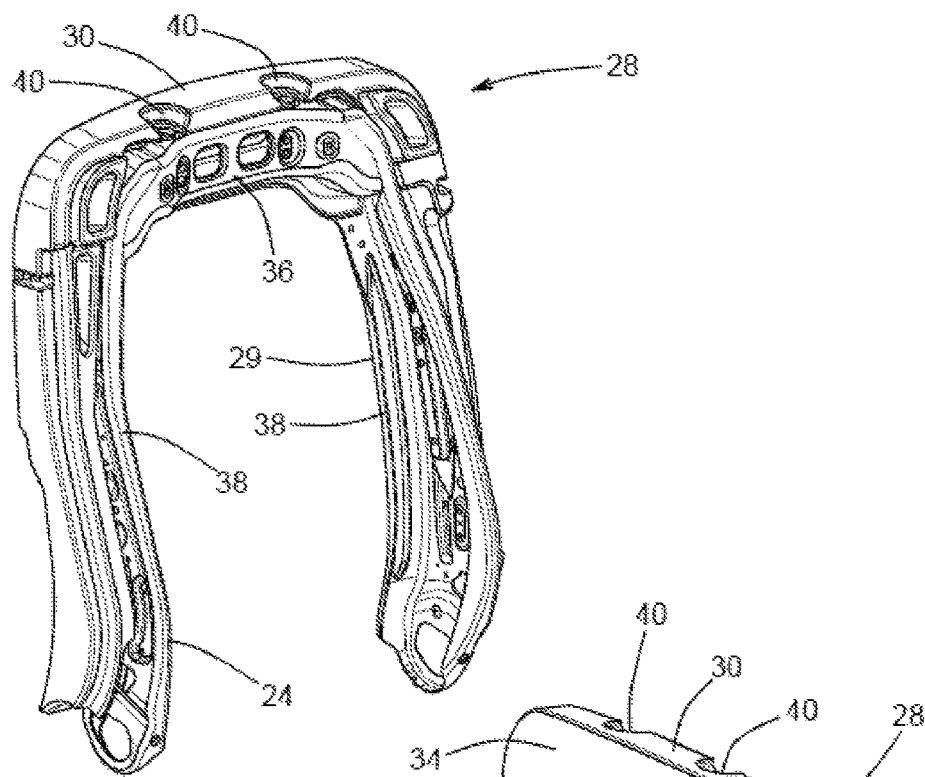
FIG. 2 is perspective view, from the front, of a seat back frame of one of the front seats.
Figure 3:
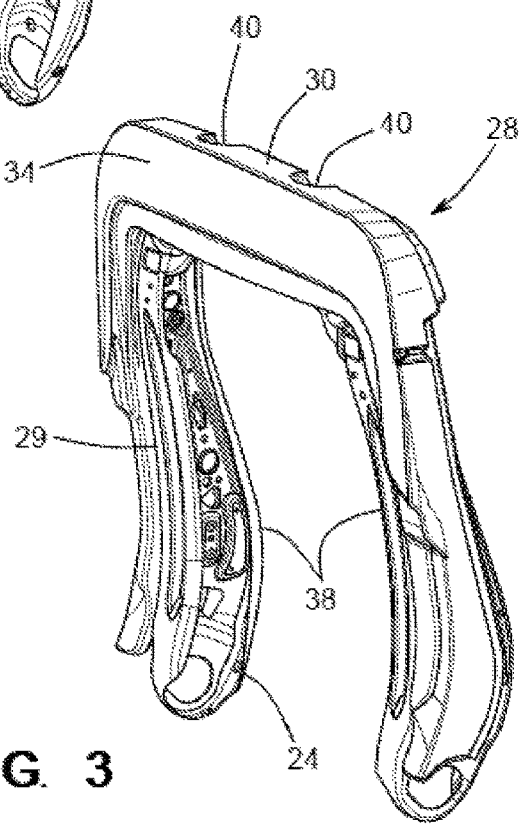
FIG. 3 is perspective view, from the rear, of the seat back frame.

Referring to FIGS. 2 and 3, the seat back 22 is illustrated without the occupant support 26 and without the trim 27 so that the seat back frame 24 is visible. The seat back 22 includes an impact pad, indicated generally at 28. The impact pad 28 is located on a rear side 29 of the seat back 22, between the seat back frame 24 and the rear seats 16. The impact pad 28 is provided to prevent an object or occupant in the rear seats 16 from contacting the seat back frame 24 and to reduce the severity of any impact between an occupant in the rear seats 16 and the seat back 22. The illustrated impact pad 28 is made of an expandable polypropylene (EPP), but may be made of any desired material. EPP material is a highly versatile, closed-cell bead foam that provides outstanding energy absorption properties, such as multiple impact resistance properties, thermal insulation properties, water resistance, and chemical resistance. An EPP formed material is a process that utilizes individual beads that are fused together under steam heat and pressure. After the fusion process is complete, the object formed may have intricate curves, tight corners, shapes and other features to serve a specific design application.

Figure 4:
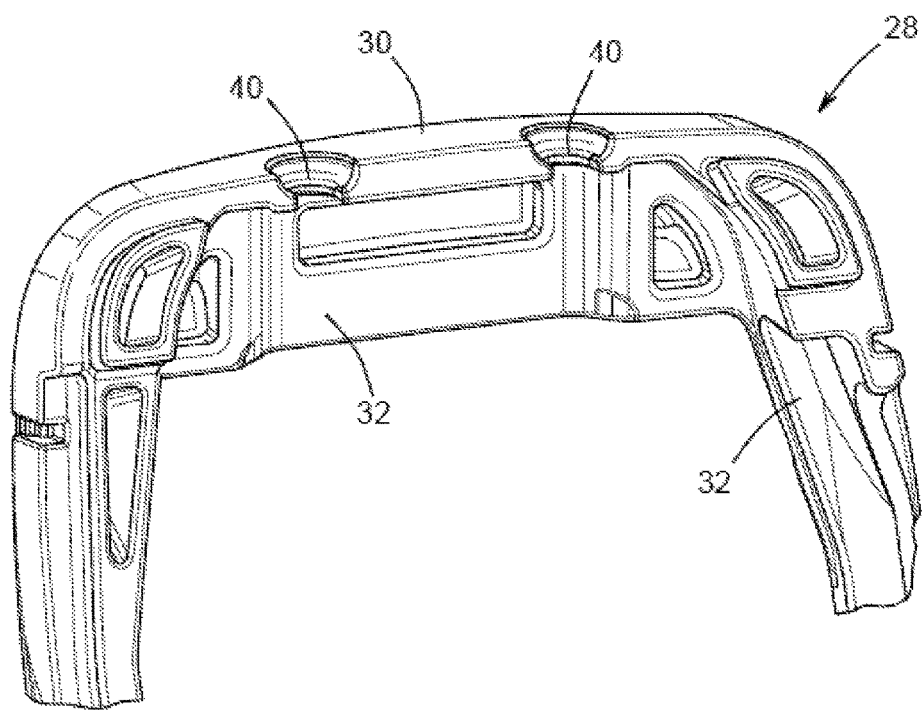
FIG. 4 is an enlarged view of an impact pad, illustrated without the seat back frame.

Referring to FIG. 4, the impact pad 28 is illustrated removed from the seat back frame 24. The impact pad 28 includes a pad body 30 which defines a frame contact surface 32. The illustrated frame contact surface 32 is formed to substantially match a contour of the seat back frame 24 in order to nest the impact pad 28 with seat back frame 24. An outer surface 34 of the impact pad 28 is shaped to a desired profile of the finished seat back 22. The illustrated impact pad 28 is located adjacent to a top portion 36 of the seat back frame 24, as well as to two side portions

38. The impact pad 28 covers a portion of the seat back frame 24 and provides an energy absorbent barrier to the respective portions of the seat back frame 24 that have a likelihood of being contacted by an object during a collision or hard braking event where the object is thrust in a forward direction, thereby reducing the impact to the object.

A thickness of the impact pad 28 is limited only to the extent of the design profile of the seat back 22. The impact pad 28 may be any thickness desired to effectively manage impacts on the seat back 22. The illustrated impact pad 28 includes apertures 40 formed therein. The apertures 40 allow access for attaching functional components that include, but are not limited to, supports for vehicle headrest, lumbar control knobs, and tethers for safety belt holders.

In the illustrated embodiment, the trim layer 27 (shown in FIG. 1) is located over the impact pad 28 and is compression fit to the seat back frame 24 thereby securing the impact pad 28 against the seat back frame 24. The impact pad 28 may also be coupled to the seat back frame 24 prior to the seat material being placed over the impact pad 28 and seat back frame 24. Such techniques for adhering the impact pad 28 may include, but are not limited to, an adhesive, a snap connection, or an overmold technique. The adhesive may be any type of glue or similar chemical that can temporarily hold the impact pad 28 in place until the trim layer 27 is trimmed in place, or the adhesive may be a chemical that permanently maintains the impact pad 28 against the seat back frame 24. For a snap connection, various structures may be formed on both the seat back frame 24 and the impact pad 28 for coupling these two components together. For an overmolding process, the impact pad 28 may be formed directly on the seat back frame 24 by molding it in place.

Figure 5:
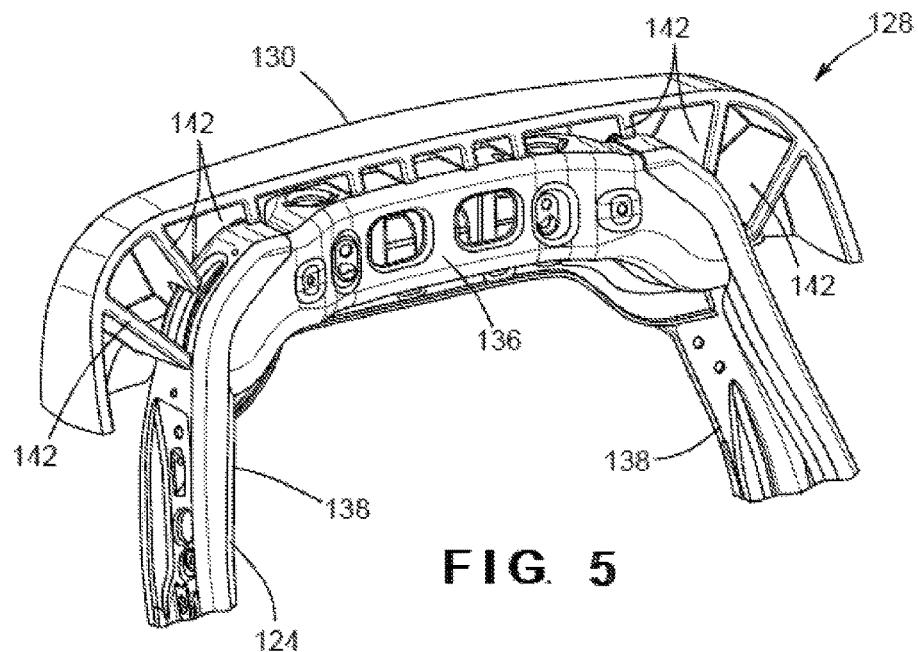
FIG. 5 is a perspective view, from the front, of the seat back frame including an alternative embodiment of the impact pad.
Figure 6:
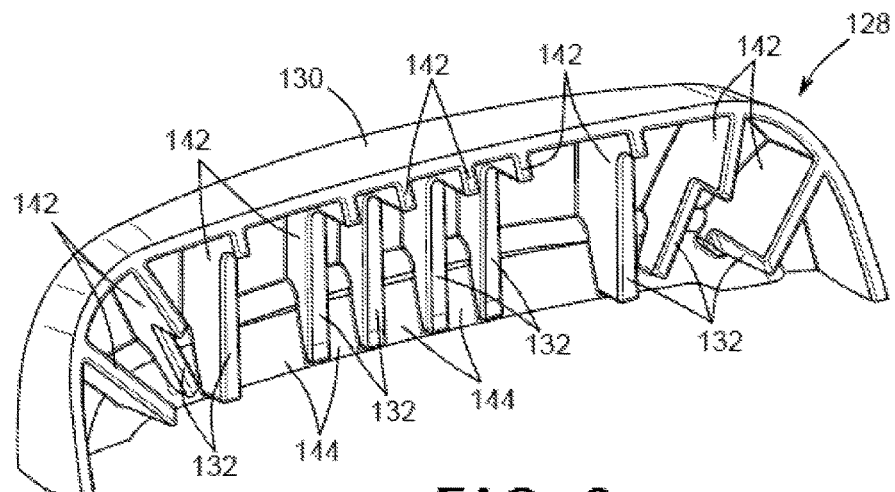
FIG. 6 is an enlarged view of the alternative embodiment of the impact pad.

Referring to FIGS. 5 and 6, a seat back frame 124 is shown with an alternative embodiment of the impact pad, indicated generally at 128. FIG. 6 illustrates the alternative impact pad 128 separate from the seat back frame 124. The alternative impact pad 128 includes a pad body 130 and a plurality of support ribs 142 that extend from the pad body 130. The support ribs 142 define respective frame contact surfaces 132. When assembled, the frame contact surfaces 132 engage the seat back frame 124. A plurality of spaces 144 are located between the support ribs 142. The spaces 144 are also located between the pad body 130 and the seat back frame 124. The spaces 144 allow the alternative impact pad 128 to be manufactured with a reduced amount of material, which in turn reduces the cost. However, the support ribs 142 maintain the structural support of the alternative impact pad 128 on the seat back frame 124.

The support ribs 142 and the spaces 144 also provide an energy absorbing feature for the alternative impact pad 128. In the event of a sudden deceleration, an object or occupant in the rear seat 16 may impact the alternative impact pad 128, causing alternative impact pad 128 to move forward. The support ribs 142 located between the pad body 130 and the seat back frame 124 reduce the contact area of the alternative impact pad 128 and the seat back frame 124. Rather than being stopped by engaging the seat back frame 124, the support ribs 142 may be deformed or crushed between the seat back frame 124 and the pad body 130. The support ribs 142 may deform by spreading out into the spaces 144, for example. This deformation of the support ribs 142 may absorb some of the energy of the impact.

The illustrated alternative impact pad 128 is located primarily adjacent to a top portion 136 of the seat back frame 124 and includes less coverage adjacent to two side portions 138, as compared to the previously-described impact pad 28. However, the alternative impact pad 128 may include additional portions adjacent to the side portions 138, if desired.

Figure 7:
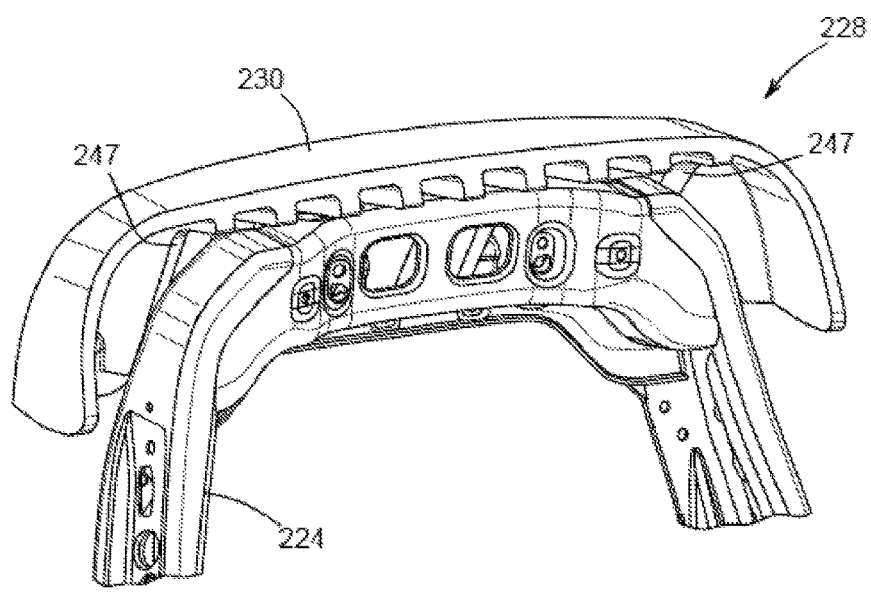
FIG. 7 is a perspective view, from the front, of the seat back frame including a second alternative embodiment of the impact pad.
Figure 8:
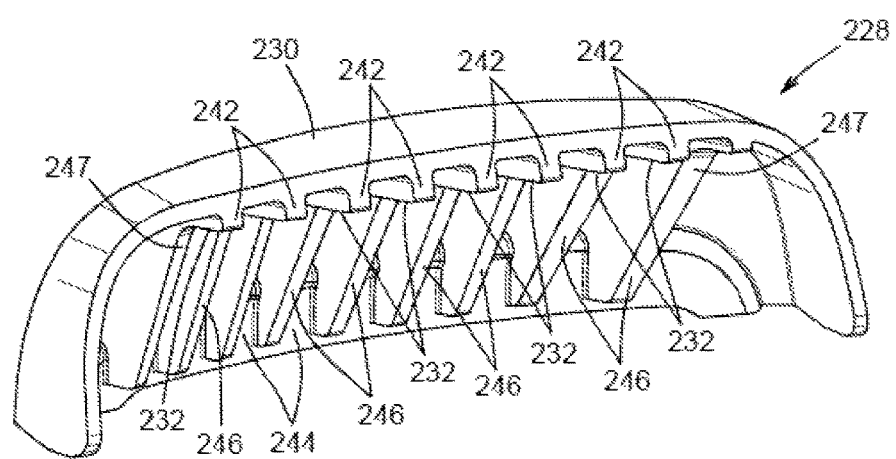
FIG. 8 is an enlarged view of the second alternative embodiment of the impact pad.

Referring to FIGS. 7 and 8, a seat back frame 224 is shown with a second alternative embodiment of the impact pad, indicated generally at 228. FIG. 8 illustrates the second alternative impact pad 228 separate from the seat back frame 224. The second alternative impact pad 228 includes a pad body 230 and a plurality of support ribs 242 that extend from the pad body 230. The support ribs 242 define respective frame contact surfaces 232. When assembled, the frame contact surfaces 232 engage the seat back frame 224. The support ribs 242 also define respective tapered portions 246 that extend from the pad body 230 to the respective frame contact surface 232. The tapered portions 246 of the support ribs 242 are not in contact with the seat back frame 224 during installation of the second alternative impact pad 228. A plurality of spaces 244 are located between the support ribs 242. The spaces 244 are also located between the pad body 230 and the seat back frame 224.

Similar to the embodiment previously described, the support ribs 242 provide an energy absorbing feature for the second alternative impact pad 228. Additionally, the tapered portions 246 of the support ribs 242 further provide an addition energy absorbing feature. The tapered portions 246 present an initial contact area 247 between the second alternative impact pad 228 and the seat back frame 224 that is relatively small. In the illustrated embodiment, the initial contact area 247 is the portion of each tapered portion 246 that is adjacent the respective frame contact surface 232. In the event of an impact that causes the second alternative impact pad 228 to move forward relative to the seat back frame 224, the initial contact area 247 of the support ribs 242 may be deformed or crushed between the pad body 230 and the seat back frame 224. As the second alternative impact pad 228 continues to move toward the seat back frame 224, additional portions of the tapered portions 246 will come into contact with the seat back frame 224. Thus, the contact area between the second alternative impact pad 228 and the seat back frame 224 increases, and an increasing amount of the support ribs 242 will be deformed against the seat back frame 224. As a result, an increasing amount of energy may be absorbed by the second alternative impact pad 228 over time.

Figure 9:
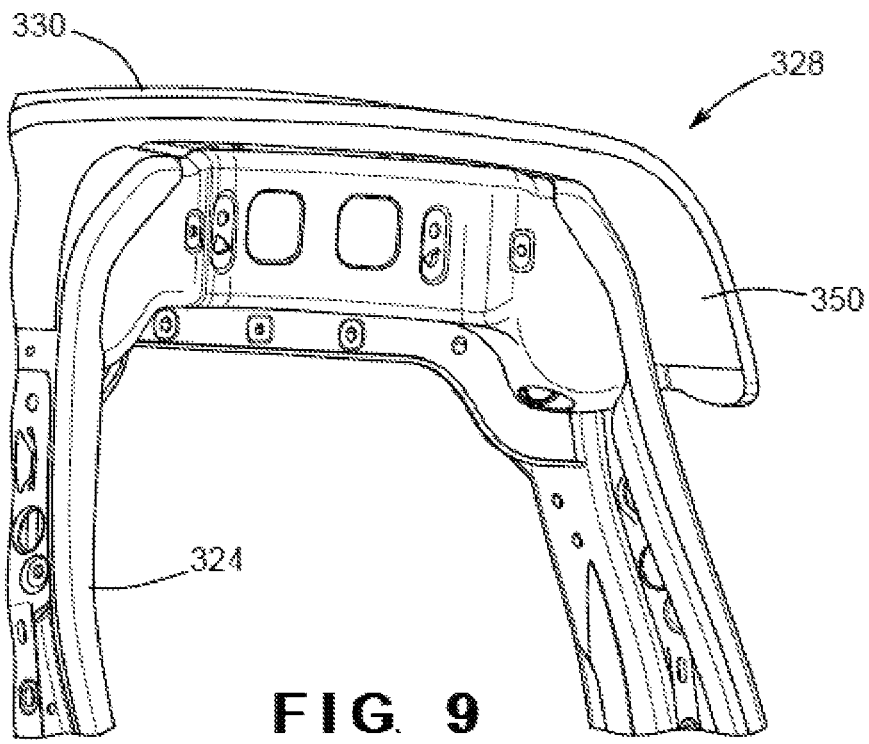
FIG. 9 is a perspective view, from the front, of the seat back frame including a third alternative embodiment of the impact pad.
Figure 10:
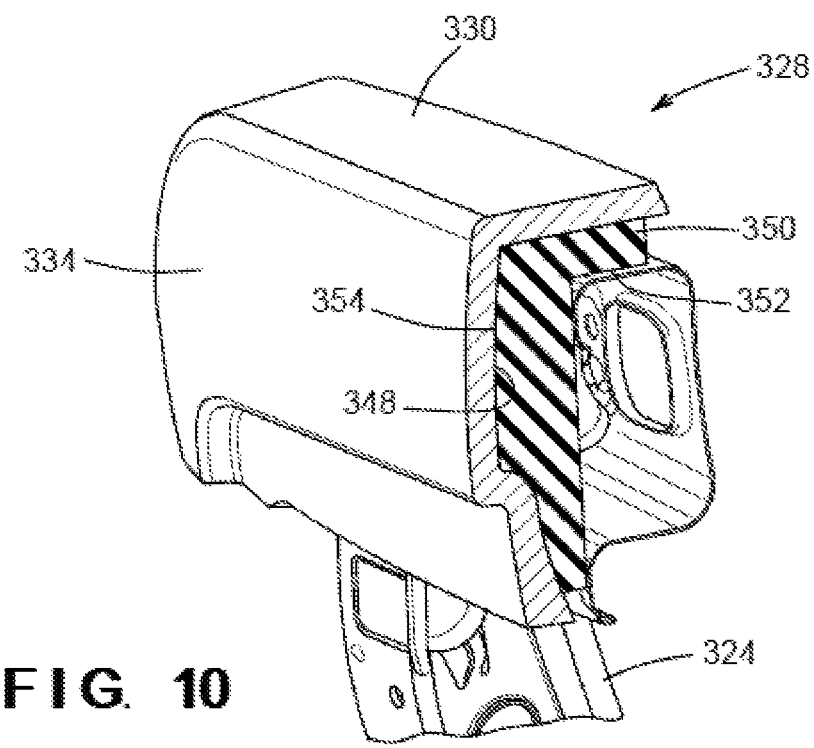
FIG. 10 is a cut away view of the seat back frame including the third alternative embodiment of the impact pad.

Referring to FIGS. 9 and 10, a seat back frame 324 is shown with a third alternative embodiment of the impact pad, indicated generally at 328. FIG. 10 illustrates a cutaway view of the seat back frame 324 and the third alternative impact pad 328. The third alternative impact pad 328 includes a pad body 330 that includes an outer surface 334 and an opposed inner surface 348. An energy absorbing foam 350 is located between the pad body 330 and the seat back frame 324. An inner foam surface 352 is contoured to the seat back frame 324, and an outer foam surface 354 is contoured to the inner surface 348 of the pad body 330.

The illustrated energy absorbing foam 350 is made of a softer material than the pad body 330. Additionally, the illustrated pad body 330 does not contact the seat back frame 324. As a result, in the event of a rear seat occupant impacting the third alternative impact pad 328, the energy absorbing foam 350 will deform and absorb energy of the impact.

The outer foam surface 354 of the energy absorbing foam 350 is contoured so that it is seated against the pad body 330 such that no coupling is necessary to maintain the pad body 330 pressed against the energy absorbing foam 350. Alternatively, the respective juxtaposed surfaces may be joined to one another utilizing an adhesive. In addition, the pad body 330 may be overmolded onto the energy absorbing foam 350.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A vehicle seat back comprising:
   a seat back frame; and
   an impact pad supported on the seat back frame, the impact pad including a pad body and a plurality of support ribs that extend from the pad body and define respective frame contact surfaces, wherein each of the frame contact surfaces of the plurality of support ribs engages the seat back frame, and wherein spaces are located between the pad body and the seat back frame and between adjacent support ribs.

2. The vehicle seat back of claim 1, wherein each of the frame contact surfaces engages both a rear side and a top portion of the seat back frame.

3. The vehicle seat back of claim 1, wherein each of the support ribs further includes a tapered portion that extends from the pad body to the respective frame contact surface.

4. The vehicle seat back of claim 3, wherein each of the tapered portions of the support ribs extends from an initial contact area that is adjacent the respective frame contact surface to an additional portion that is not adjacent the respective frame contact surface.

5. The vehicle seat back of claim 1, wherein the impact pad is formed from an energy absorbing foam material.

6. The vehicle seat back of claim 1, further including a trim layer that is located over the impact pad and is compression fit to the seat back frame.

7. The vehicle seat back of claim 1, wherein the pad body is made of an expandable polypropylene material.

* * * * *

UNITED STATES PATENT AND TRADEMARK OFFICE
CERTIFICATE OF CORRECTION

PATENT NO. : 10,195,969 B2  
APPLICATION NO. : 15/392634  
DATED : February 5, 2019  
INVENTOR(S) : Veine et al.

It is certified that error appears in the above-identified patent and that said Letters Patent is hereby corrected as shown below:

On the Title Page

Item (72) Inventor is corrected to read:
-- Eric Veine, Wixom, MI;
Ashford Galbreath, Troy, MI;
Thomas Hicks, Livonia, MI;
Mladen Humer, West Bloomfield, MI --.

Signed and Sealed this
Twenty-fourth Day of September, 2019

Andrei Iancu
*Director of the United States Patent and Trademark Office*